3,537,859
PROTEIN FOOD PRODUCT AND PROCESS
Mokhtar M. Hamdy, Minneapolis, Minn., assignor to Archer-Daniels-Midland Company, Minneapolis, Minn., a corporation of Delaware
No Drawing. Filed May 2, 1966, Ser. No. 547,393
Int. Cl. A23j 3/00
U.S. Cl. 99—17                                                7 Claims

ABSTRACT OF THE DISCLOSURE

Protein food products simulating bacon in texture and appearance are prepared by extruding a homogeneous mixture of a defatted oil seed proteinaceous material (e.g., soy meal), fat, water, and flavoring at a temperature of 180°–280° F. under pressure into a region of lower temperature and pressure.

---

The present invention relates to the production of meat-like food products from vegetable, fish and similar protein sources. In another aspect, the present invention relates to the production of protein structures having a texture and appearance very similar to cooked bacon.

The preparation of meat-like food products from other protein sources has long been an aim of the food industry. Heretofore, food technologists have relied in many instances on the art developed in the production of synthetic fibers for the textile industry to produce fiber products from vegetable proteins and other sources which, when processed, simulate the texture of meats.

Thus, U.S. Pats. Nos. 2,682,466 and 2,730,477 and related patents, describe the preparation of protein fibers by solution or colloidal dispersion of protein in aqueous alkaline phase, passing such solution through a spinneret and into an acid coagulating bath and recovering and stretching the resulting fibers. Stretching is required to impart toughness or chewiness to the product. The fibers are then mixed with an edible binder which may be either physical or adhesive in nature. The final product is obtained by compounding the fibers into a tow which is then cut into suitable lengths and packaged.

In another method such as described in U.S. Pats. Nos. 2,830,902 and 2,813,025 and related patents, a solution of protein is formed which is then precipitated under agitation at elevated temperature by lowering the pH of the solution. The resulting precipitate may then be mixed with a binder and stirred into a uniform taste which can be shaped into any form desired, such as strands. The resulting strands are autoclaved with steam to give rise to the final product.

The prior art methods of preparing meat-like products from non-animal protein sources suffer from a number of disadvantages, especially with regard to the production of a bacon-like product. Thus, both above-mentioned methods require protein isolates or concentrates which are separated from available protein-containing materials. Furthermore, the apparatus required for production of these products necessitates a large capital investment. Additionally, the resulting product is difficult to handle, package and store. Of course, with regard to the present invention, the major disadvantage of the prior art is that a product simulating the mellow, yet crisp texture of bacon has not as yet been produced.

It is, therefore, an object of the present invention to provide a protein product of bacon-like texture, appearance and quality. It is a further object to produce such meat-like products from inexpensive, nutritious raw materials. It is a further object of the present invention to process a protein product which has the friable and mellow texture of bacon and which resembles bacon in mouth-feel. Other objects of the present invention will be apparent hereinafter.

The protein product of the present invention is obtained by the extrusion of a protein-containing composition at temperatures from about 180° F. to about 280° F. through orifices into a medium of lower pressure to result in a protein product which has been altered in physical structure, such as in shape, color, flavor and overall quality by the said extrusion. The protein product is characterized by its mellow, yet friable texture and its porous structure. The word "mellow" as used in this application means and includes the characteristic of a food product which allows it to be dissolved in the mouth after chewing. Further, the product of this invention is not oriented to any significant degree; nor is the product expanded to any significant degree.

The protein extrudate of the present invention is a mellow, porous, friable, unoriented and unexpanded bacon-like product made up of protein particles and containing entrained moisture and fat. The product, after drying, resembles bacon and may be used in all bacon uses wherein an aqueous solution is not contacted.

The process employed to form the bacon-like protein product of the present invention comprises, more specifically, admixing the protein-containing raw material with an emulsion of water and oil, subjecting the resulting mixture to pressure such that the mixture is heated by compression to a temperature above about 180° F., and then extruding the pressure-heated mass through one or more flow-restricting orifices, said orifices being heated so that a temperature differential of at least 15° F. is obtained, into a medium of lower pressure and temperature. The extrudate which emerges from the extruder does not expand due to vaporization of the water since the heat supplied by the compression and by the extrusion die is not sufficient to vaporize the water, the vaporization tendency of which is depressed by the presence of the fat.

Although an extremely wide variety of equipment may be employed to accomplish the aforesaid process steps, it will be apparent that non-plasticizing extruders of the type employed in the cereal puffing industry are eminently suited to the process of the present invention. These extruders, comprising a barrel, a rotating screw within hte barrel, and a heated extrusion die at the front end of the barrel, blend the protein-containing extrusion mixture, hereinafter also called the protein mix, while simultaneously compressing the mixture to heat to the desired temperature. The rotating screw builds up to the pressure desired to force the protein-containing mixture through the restricted heated orifice in the extrusion die, giving rise to the pressure differential across the die orifice required to cause the formation of the friable, porous extrudate.

Although the following explanation of the unique properties of the protein product of this invention is not to be considered as binding, it is given for better understanding of the novel product of the present invention. It is believed that the mellow, yet crisp texture of the protein product is the result of the compression of protein-containing granules and the adhesion of these compacted granules is due to the water and oil mixture. The product is not expanded when it issues from the extruder because the heat imparted due to the compression in the heated die is not sufficient to vaporize the water or oil mixture, the oil having the effect of depressing vaporization of the water. The entrained water and oil impart to the compacted vegetable protein-containing granules the mellow, friable texture desired in a product such as a bacon-like additive for non-aqueous foods, e.g., peanut butter.

The process of the present invention is not limited to any particular type of protein. Any type of edible protein of vegetable, fish or animal origin may be employed. The preferred proteins from the standpoint of an optimum product are the oil seed proteins, such as; soybean, peanut, cotton seed, sesame seed and the like. The protein may be employed in substantially pure or water-soluble form or, as is preferred, in the form of flakes or granules, generically herein referred to as meal, obtained on expression, expulsion or solvent extraction of oils and other fatty materials from the oil seed. Particularly, the grits obtained by expulsion of the oil from oil seeds such as soybeans are suitable for this process. The processes of expulsion, expression and solvent extraction of oil seeds to remove oil and other fatty materials are processes well-known in the art and thus need not specifically be described. The protein-containing oil seed meals which have protein concentrations of 40–70% are preferred since they can be extruded into the product of the present invention over a broad range of conditions. Further, it is preferred that the protein material used in the present process be obtained by expulsion of the oil from the seed rather than by solvent extraction or expression, i.e., the expelled meal contains greater amounts of fat which are desired in the present process. The protein should comprise at least 30% based on the solids content of the product.

The fat which is incorporated in the mix can be any of the well-known vegetable or animal oils which are used in cooking. For example, hydrogenated cottonseed oil, soybean oil, corn oil, safflower oil or any of the other well-known oils. Frequently, in order to obtain a homogeneous mixture of oil and water, an emulsifier is used. This emulsifier can be any of the well-known emulsifiers for fat and water mixtures, such as glycerol monostearate and the like. The amount of fat used in the mix depends partially upon the degree of friability desired in product, but generally will be in the range of from 1% to 20% by weight. In order to compound the fat and water mixture, generally the fat, if it is solid, is melted or the oil is heated with the emulsifier and then the mixture is emulsified with a portion of water in a high speed mixer. The presence of fat in the mixture serves to depress the vaporization and thus to depress the puffing of the final product. Other food emulsifiers may be used to obtain good emulsions to coat the base mix, e.g., soy meatone grits.

The physical characteristics of the extrudate, for any given starting material, are principally governed by the concentration of water and oil in the protein mix, the temperature to which the protein mix is heated during the extrusion and the pressure developed in the extruder balance must be maintained between the fat and the mix, and the water and the mix in order that the vaporization of the water is depressed. As is well-known, proteins contain bound water which may not be released during extrusion. The concentration of bound water is not constant and increases with the increase in inner surface area and vice versa. It also varies with the nature of the proteinaceous starting material employed. Hence, the minimum concentration of water, necessary to obtain the formation of the mellow extrudate will vary, but should be at least 10–20% by weight of the mix. If the water concentration is adjusted too high, it will interfere with the flow of protein mix to the extruder. From the foregoing description, it is apparent that the lower concentration of water is primarily dependent upon the nature and concentration of the protein in the protein mix, while the upper concentration is limited by the extrudability of the material which is a function of the extruder design. In general, it was found that the total concentration of water will vary from 10–20% of the protein mix.

The temperature of the extrusion will vary; however, it usually ranges between 180° F. and 280° F. The temperature rise is due largely to the heat of compression in the protein mix during extrusion and partially to the temperature of the heated die. The upper limit of the extrusion temperature is dictated by the stability of the protein mix. Thus, the temperature should not be so high as to cause detrimental effects in the protein mix. Extrusion temperatures should, therefore, be maintained within a range of 180° F. to 280° F. and preferably within the range of 200–250° F.

The effect of pressure is difficult to establish in view of the other factors affecting the quality and nature of the extrudate. However, it will be apparent that a certain minimum pressure is necessary to force the extrudate out of the orifice and to maintain the water and fat additives in the protein mix.

Relatively high pressures will result in more compaction and consequently in higher shear rates which, in turn, result in better cohesion and retention of structure in the product. There is no upper pressure limit for the process of the present invention; hence, the upper limit is, in general, dictated by the type of equipment employed. The design of the extrusion orifice is a matter of choice and may vary from a slit orifice to a circular or square orifice. It should only be remembered that the extrusion orifice should not be so large that the extrusion equipment cannot produce the necessary pressure differential.

Various additives may be blended into the protein mix to improve its extrusion characteristics or to alter the physical features of the extruded product with respect to flavor, color and texture. Typical additives which may be incorporated in the protein mix are, table salt, flavoring ingredients such as; smoked torula yeast, dyes, and the like. It will be apparent that various other flavor and coloring additives normally added to meat-like protein products, may also be added to the protein mix of the present invention prior to extrusion.

The mellow, porous, friable extrudate emerges from the extruder as one or more continuous strands. It is, in general, desirable to cut the extrudate into pieces for easier packaging, handling, or storing. Ordinarily, a slightly moist extrudate is obtained. From a standpoint of storage and transportability, and in some cases, use, it is desirable to dry the moist extrudate prior to packaging. The texture of the product may be made more mellow by incorporating a greater amount of fat in the protein mix; however, the dry product, when obtained by extruding a mix having the proportions described above, has a texture which closely simulates the texture of cooked bacon.

The invention is further illustrated by the following example:

EXAMPLE I

Six parts by weight of Wesson oil, a commercial cottonseed oil product, were heated with 1.5 parts by weight of a commercial emulsifier (glycerol monostearate) until a homogenous mixture was obtained. The oil and emulsifier mixture was then added to an amount of water such that, when the emulsion was added, to the protein material the mix contained 13.8% moisture, and mixed in a high speed mixer until a stable emulsion was produced. This emulsion was added to 70 parts by weight of soybean grits containing 6.5% oil. Also added to the mixture thus produced were 11 parts by weight of a smoked torula yeast flavoring agent, 9.5 parts by weight of table salt, 0.05 part by weight of a coloring dye (FD&C Red No. 2) and 2 parts by weight caramel powder. The mixture was blended in a ribbon blender at room temperature (e.g., 75° F.) for about ten minutes.

The resulting mixture was extruded in a Kell Dot Model 140 extruder, equipped with a ribbon die having dimensions of 0.042 inch by ⅜ inch. The die was maintained at a temperature of 225° F. The screw was rotated at a rate of 420–430 r.p.m.

The product showed no apparent expansion on emerging from the die. Moist protein strands were obtained which were cut into ¼″–¾″ lengths by a rotating knife. After the product was dried, it was found to have a crisp yet mellow texture and a flavor and texture which resembled bacon. When incorporated in a peanut butter spread, no apparent loss of texture was noted. The peanut butter product obtained seemed to have an improved taste and improved eating texture.

The present invention provides a bacon-like product having the texture, appearance and eating characteristics of cooked bacon. It is readily produced on a continuous basis and can be packaged, handled and stored in the dry form without requiring canning or special packaging. The product is especially suitable for incorporating in an oil-based spread such as peanut butter to improve nutritional characteristics and eating quality. The process of this invention is eminently suited for the conversion of inexpensive protein sources such as; soymeal, into highly attractive meat-like products of high nutritional value. It is evident that numerous modifications will appear to those skilled in the art upon reading the foregoing disclosure. All such modifications are intended to be included in the scope of the invention as defined in the following claims.

The embodiments of the present invention in which an exclusive property or privilege is claimed or defined as follows:

1. The process of preparing a friable, mellow, porous protein food product having an edible protein content of at least 30% based on the product which comprises extruding a homogeneous mixture of a defatted oil seed proteinaceous material having a protein concentration of 40 to 70%, 1 to 20% by weight of fat, and 10 to 20% by weight of water, at a temperature of 180°–280° F., under pressure, through an orifice into a medium at lower pressure, and drying the resulting product.

2. The process of claim 1 wherein the proteinaceous material is a soy protein.

3. The process of claim 1 wherein a meatlike flavoring ingredient and a coloring agent, are incorporated in the mix prior to extrusion.

4. The product produced by the process of claim 1.

5. The process of preparing a friable, mellow, porous protein food product having an edible protein content of at least 30% based on the product which comprises extruding a homogeneous mixture consisting essentially of a defatted oil seed proteinaceous material having a protein concentration of 40 to 70%, 1 to 20% by weight of fat, and 10 to 20% by weight of water, at a temperature of 180°–280° F., under pressure, through an orifice into a medium at lower pressure, and drying the resulting product.

6. The process of claim 5 wherein the proteinaceous material is a soy protein.

7. The process of claim 5 wherein a meatlike flavoring ingredient and a coloring agent, are incorporated in the mix prior to extrusion.

References Cited

UNITED STATES PATENTS

| | | | |
|---|---|---|---|
| 3,047,395 | 7/1962 | Rusoff et al. | 99—14 |
| 3,102,031 | 8/1963 | MacAllister et al. | 99—14 |
| 3,119,691 | 1/1964 | Ludington et al. | 99—2 |
| 3,139,342 | 6/1964 | Linskey | 99—2 |
| 3,142,571 | 7/1964 | McAnelly | 99—14 |
| 3,253,931 | 5/1966 | Coleman et al. | 99—18 |
| 3,320,070 | 5/1967 | Hartman | 99—17 |

FOREIGN PATENTS

| | | |
|---|---|---|
| 993,683 | 6/1965 | Great Britain. |

MAURICE W. GREENSTEIN, Primary Examiner

U.S. Cl. X.R.

99—14